March 13, 1951 P. WESTBERG 2,544,870
SOLE EDGE ROUGHING-UP MACHINE
Filed Dec. 15, 1947 2 Sheets-Sheet 2
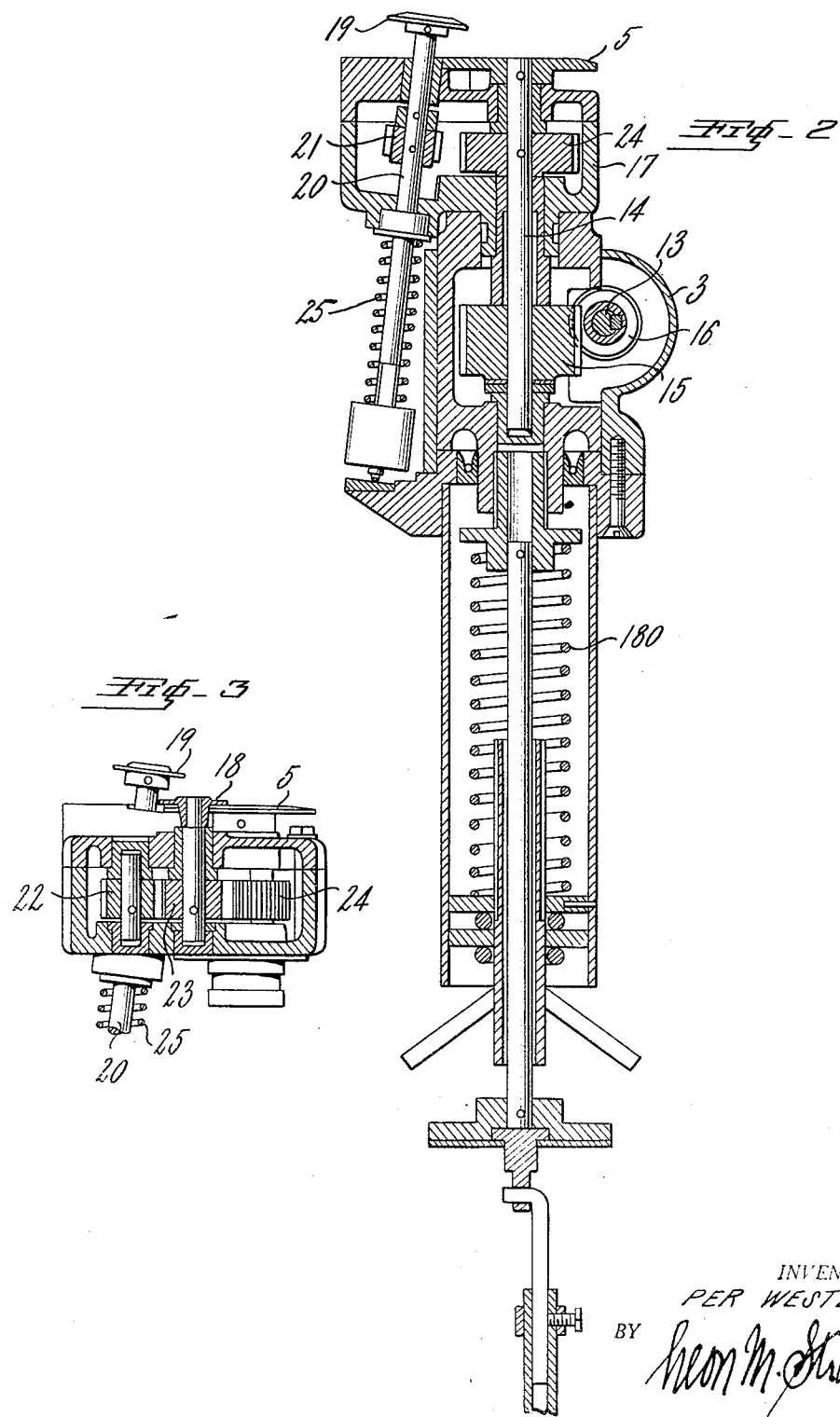
INVENTOR.
PER WESTBERG Patented Mar. 13, 1951

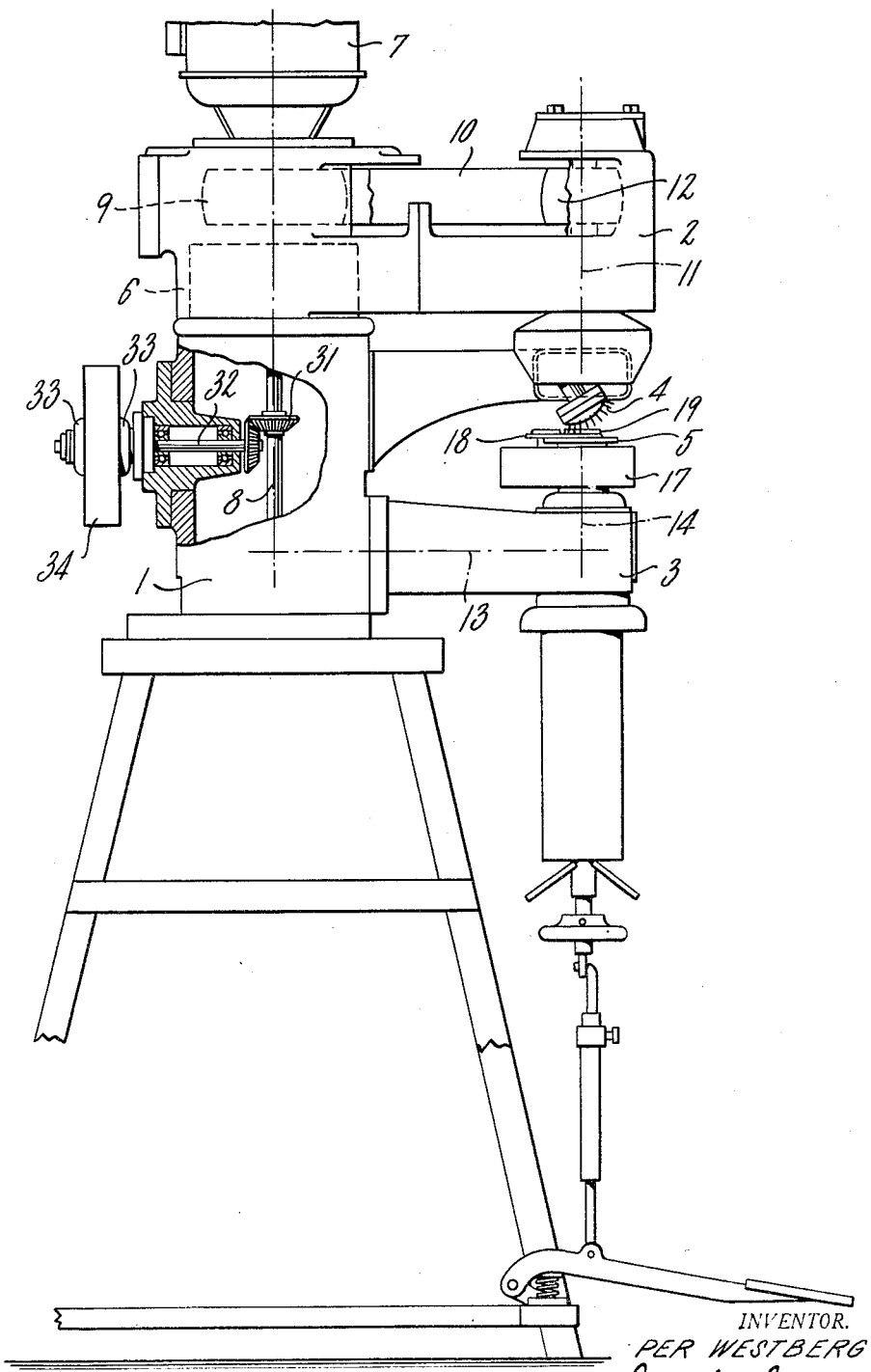

2,544,870

UNITED STATES PATENT OFFICE 2,544,870

SOLE EDGE ROUGHING-UP MACHINE

Per Westberg, Orebro, Sweden, assignor to Aktiebolaget Alona, Orebro, Sweden, a joint-stock company of Sweden Application December 15, 1947, Serial No. 791,901
In Sweden June 25, 1947

5 Claims. (Cl. 69—1)

Roughing up machines for soles, especially leather soles, in which a rotatable roughing tool co-operates with a rotatable, driven work table and with rotatable feeding rollers, which feed the work to the tool, and at least one of which is journalled in an inclined position relatively to the axis of the work table, are already known. The known roughing machines of this kind consist of a stand with two fixed brackets arranged at different levels, the upper one of which serves as a journal for the shaft of the rotatable roughing tool, which by means of a belt transmission is driven from a source of power, and the lower one of which serves as a journal for the rotatable work table and the feeding rolls co-operating with the latter. By means of gears, the power required for the rotating movement of the work table is transmitted from the main shaft of the machine arranged in the stand thereof, which main shaft also drives the shaft of the roughing tool.

This construction, however, has several drawbacks, among which are noted firstly the indirect drive of the shaft of the roughing tool and that the power required for the movement of the work table is transmitted from the same shaft, and further that the roughing tool maintains always the same position relatively to the work table. Moreover, the known machines are only suitable for roughing up soles so that the use of these machines is very limited.

The present invention has for its object to eliminate the above mentioned drawbacks. It relates to a leather-sole working machine, the essentially characteristic features of which are that a vertical shaft journalled in the machine stand and preferably directly driven by an electric motor is arranged, by means of suitable transmission gears, so as to drive the roughing tool, which is rotatably journalled on a bracket, and further the work table, which forms the support for the working piece and is rotatably journalled on another bracket, the shaft further driving a tool for roughing the upper leather, which tool is arranged in another horizontal plane and possibly in another vertical plane than that of the roughing tool for the soles and the working table, the bracket carrying the roughing tool being rotatable on the machine stand round the said vertical shaft and lockable in any desired position, and the shaft of the work table being arranged so as to drive at least one of the feeding rolls.

Additional characteristic features will be apparent from the following specification reference being had to the accompanying drawings, which schematically, by way of example, show an embodiment of a roughing machine for leather in accordance with the invention. Fig. 1 shows a side view of the machine, partially in section, Figs. 2 and 3 certain details on a larger scale.

In the drawings, 1 denotes the machine stand, which is provided with two brackets 2, 3, the upper one of which, 2, serves as a bearing for the rotatable roughing tool 4, and the lower one, 3, as a bearing for the work table 5. The bracket 2 together with the roughing tool is rotatable in a horizontal plane round a cylindrical bearing 6 on the stand 1, and by means of a locking device, not shown in the drawing, can be locked in any desired position with respect to said stand. In this way, the roughing tool can be adjusted in different positions relatively to the vertical shaft of the work table or may be completely swung out of the reach of the table, so that the work fixed thereon can be easily handled and inspected.

On the rotatable bracket 2 there is arranged a vertical electric motor 7, the shaft of which is schematically shown at 8. On said main shaft 8 is arranged a pulley 9 which, by means of a belt 10, drives a pulley 12 mounted on the shaft 11 carrying the roughing tool and thus sets the tool in rotation. It will be understood that the transmission of power from the motorshaft 8 to the shaft 11 of the roughing tool may be effected in other ways, for instance by a conical gearing, a worm wheel or the like.

The shaft 8, by means of a suitable gearing, drives a horizontal shaft 13, rotatably journalled in the lower bracket 3, from which shaft 13 the rotary movement of the shaft 14 of the work table is transmitted, for instance by means of a worm 16 and a worm wheel 15. The work table with its vertical shaft 14 is journalled in a bearing 17, which, against the force of a spring 180, by means of a pedal or some other device that does not form part of the present invention, may be lowered or raised. In the bearing 17 are journalled two feeding rolls 18, 19, of which roll 18 is arranged on a vertical shaft which is parallel with the shaft 14 of the work table, whilst the other roll 19 with its shaft 20 is journalled obliquely to the shaft 14 of the table. The feeding rolls, by means of gears 21, 22, 23, are driven by toothed wheel 24 mounted on the shaft 14 in such a way that the feeding rolls have a greater peripheral speed than the work table itself (Figs. 2 and 3).

The intermediate shaft 13, which drives the rotatable shaft 14 of the work table, is provided with eccentrically arranged bearings, by which said shaft 13 may be adjusted in the right position relatively to the main shaft 8 and the shaft 14 of the work table in accordance with wear of the gears.

When the work table 5, and thus also the bearing 17, is raised, the work, e. g. a leather sole which is to be roughed, will be jammed or clamped between the horizontal surface of the table and the inclined feeding roll 19, which is subjected to the action of a spring 25, and will automatically be fed below the roughing tool by said roll and the other roll 18, which acts on the vertical edge of the work piece.

Owing to the fact that the bracket 2, in which the roughing tool is journalled, is rotatably arranged, the tool may be secured at will in any desired position relatively to the work table, so that the tool always has the position which is most favourable for the roughing work. If needed, the bracket 2 may be swung out completely, so that the work table and the work fastened upon it can be easily inspected.

According to the invention the main shaft 8 of the machine is provided with a gearing device 31, consisting of conical gears, a worm gear or the like, which is transmitting the rotation from the main shaft to a horizontal shaft 32 which is journalled in ball bearings and is at its free end provided with means 33 for fixing a rotatable tool 34, for instance a steel wire brush or the like, by means of which the upper leather of a shoe is roughed. Suitably the shaft 32 is arranged in another horizontal plane than that of the roughing tool for soles and that of the work table. The shaft 32 may also be arranged in another vertical plane.

By means of the combination of the tool for roughing soles with a tool for roughing the upper leather the scope of use of the machine is considerably enlarged, at the same time as valuable floor space is saved in the shoe manufacturing plant by the fact that no special machine for roughing the upper leather needs be provided.

The invention is not limited to the embodiment described in the above specification and illustrated in the drawings, but may be modified or combined in any way without deviating from or exceeding the scope of the invention.

Having now described and ascertained the nature of the invention, what I claim as new and desire to protect by Letters Patent is:

1. In a sole roughing machine having a stand carrying a rotatable roughing tool, a rotatable work table and rotatable feeding rolls for feeding a work piece to said tool; a power driven shaft journalled in said machine stand, transmission means connected to said driven shaft for driving said roughing tool, a first support for said tool positioned on said stand and arranged for swinging movement relatively to said work table and about said driven shaft, a second support for said work table and positioned on said stand and spaced from said first support, means operatively connected to said driven shaft for driving said work table and at least one of said feeding rolls, and bearing means on said stand permitting said swinging movement of said first support in a plane perpendicular to said driven shaft.

2. In a machine according to claim 1, including means for reciprocably moving said work table and substantially in parallel relation to said driven shaft, said latter means including a spring supporting said work table, and means for adjusting the pressure of said spring.

3. In a machine according to claim 1, including another shaft carrying said one feeding roll, and a further shaft for carrying said work table, said other shaft of said feeding roll being inclined with respect to said further shaft of said work table, and means interconnecting both said other and further shafts with each other for rotating said work table and said one feeding roll.

4. A machine for roughing soles comprising a power driven first shaft, a horizontal bracket, one end of said bracket being pivotally arranged for swinging movement in a plane perpendicular to and about said first shaft, a second shaft journalled in the other end of said first bracket, said second shaft being adapted for connection with a roughing tool, first transmission means connecting said second shaft with said first shaft for rotation of said tool, a fixed bracket positioned below said first-named bracket, a third shaft journalled in said fixed bracket, a work table mounted on said third shaft, second transmission means connecting said third shaft with said first shaft for rotation of said work table, said first bracket being swingable to bring said roughing tool into position above said work table, a clamping mechanism connected with said table for holding a work piece on the latter and for rotating said work piece relative to said roughing tool, and lifting means for moving said table toward and away from said roughing tool.

5. A machine according to claim 4, said lifting means comprising a bearing for said third shaft and secured to said fixed bracket, said clamping mechanism including a feeding roll rotatably journalled in said bearing and projecting beyond said work table, thereby enabling said work piece resting on said table to be clamped between said table and said feeding roll when raising said table, spring means tending to oppose upward displacement of said feeding roll by said table, and third transmission means connecting said feeding roll with said third shaft for positive entrainment thereby.

P. WESTBERG.

REFERENCES CITED

The following references are of record in the file of this patent:

FOREIGN PATENTS

| Number | Country | Date |
| --- | --- | --- |
| 881,746 | France | Feb. 4, 1943 |